No. 699,501. Patented May 6, 1902.
A. DONOVAN.
BUTTER CUTTER.
(Application filed Dec. 11, 1901.)
(No Model.)
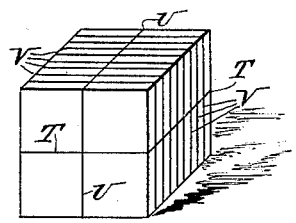
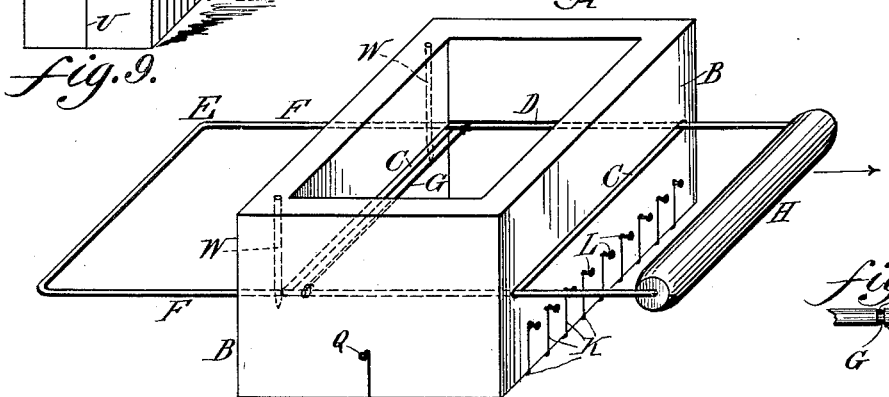
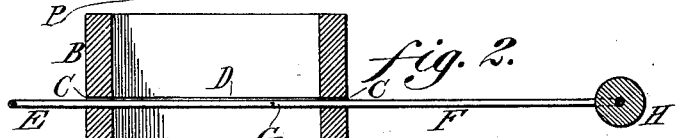
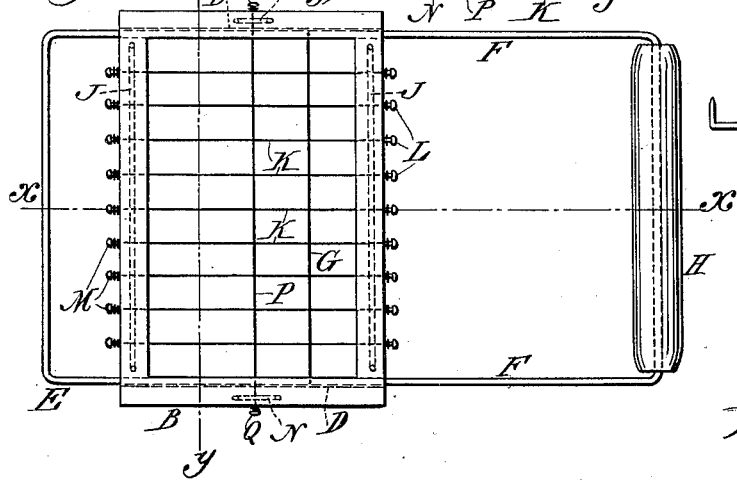
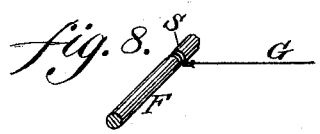
Witnesses
Inventor
Alford Donovan
Attorneys
THE NORRIS PETERS CO., PHOTO-LITHO., WASHINGTON, D. C.

UNITED STATES PATENT OFFICE.

ALFORD DONOVAN, OF ATLANTIC CITY, NEW JERSEY, ASSIGNOR OF TWO-THIRDS TO JACOB MYERS, DANIEL MYERS, AND JAMES G. PIZAGNO, OF ATLANTIC CITY, NEW JERSEY.

BUTTER-CUTTER.

SPECIFICATION forming part of Letters Patent No. 699,501, dated May 6, 1902.

Application filed December 11, 1901. Serial No. 85,431. (No model.)

*To all whom it may concern:*

Be it known that I, ALFORD DONOVAN, a citizen of the United States, residing in Atlantic City, county of Atlantic, State of New Jersey, have invented a new and useful Improvement in Butter-Cutters, of which the following is a specification.

My invention consists of an improved butter-cutter having means for cutting the butter transversely and then longitudinally.

It further consists of novel details of construction, all as will be hereinafter set forth.

Figure 1 represents a perspective view of a butter-cutter embodying my invention. Fig. 2 represents a sectional view on line $x\ x$, Fig. 3, in reversed position. Fig. 3 represents a plan view of said cutter. Fig. 4 represents a sectional view on line $y\ y$, Fig. 3. Figs. 5, 6, 7, and 8 represent views of detached portions thereof. Fig. 9 represents a perspective view of the butter after it has been cut.

Similar letters of reference indicate corresponding parts in the figures.

Referring to the drawings, A designates a butter-cutter consisting of the frame or body portion B, having the slots C in the opposite walls thereof and being open at top and bottom, said slots C communicating with the passages D in the end walls and being adapted to receive a frame E, the side bars F of which are adapted to move in said passages D and have secured thereto a cutter G, which is of any suitable material—as, for example, wire—said frame E being provided with a suitable handle H. Secured to the under portion of the side walls are the notched bars or rods J, the notches of which being adapted to receive the knives or cutters K, which are formed of any suitable material, one end of each of which is connected with the pins L and the opposite ends with the adjusting-pins M, which are suitably secured in the frame B, it being noted that said cutters pass beneath the open end of the frame B and beneath the slide.

N designates a rod or bar provided with three notches, which are secured to the under side of the end pieces of the body portion B.

P designates a knife or a cutter, which extends transversely with respect to the cutters and occupies one of the notches in the rod or bar N, the same being secured to a pin Q and an adjusting-pin R. It will be noted that the side bars F are provided with the recess S in order that the cutter G will be properly held in position.

The operation is as follows: The cutter G and frame B are pushed back into the position so that the cutter G is within the rear slot C. The body portion B is then placed over the butter to be cut and forced down, whereby it will be seen that the cutters K cut the butter from side to side and the cutter P cuts the butter in half. The butter thus cut is now in position within the body portion B, and the operator pulls the handle in the direction indicated by the arrow in Fig. 1, so that the cutter G passes through the butter, it being seen in Fig. 9 that the cutter G forms the cut T, the cutter P forms the cut U, while the cutters K form the cuts V, after which the butter can be placed upon a plate or a suitable receptacle in this cut position, it being seen that by a device of this character the butter is quickly and evenly cut without loss thereof. If desired, I may employ pins W, which project through the rear slot C and act as a stop to prevent the improper movement of the frame E in either direction.

It will be seen that if the butter to be cut is not as wide as the frame that the cutter P can be adjusted in its position in the notches in the bars N, so that the said cutter P will pass through substantially the center of the butter.

It will be evident that various changes may be made by those skilled in the art which will come within the scope of my invention, and I do not therefore desire to be limited in every instance to the exact construction herein shown and described.

Having thus described my invention, what I claim as new, and desire to secure by Letters Patent, is—

1. In a butter-cutter, a body portion, open at top and bottom, cutters passing across the bottom thereof, and a movable cutter suitably mounted in substantially the center of said body portion and adapted to be operated after the first-mentioned cutters have cut the butter whereby the latter is cut in half.

2. In a butter-cutter, a body portion, cutters secured to the bottom thereof, passages in the body portion, a frame having side bars moving in said passages and a cutter secured to said frame and adapted to move therewith.

ALFORD DONOVAN.

Witnesses:
FRANK A. PIZAGNO,
E. D. HUDSON.